Sept. 18, 1945.  LE ROY I. HOAGLAND  2,384,914
PLUMB BOB LINE REEL
Filed Dec. 9, 1944
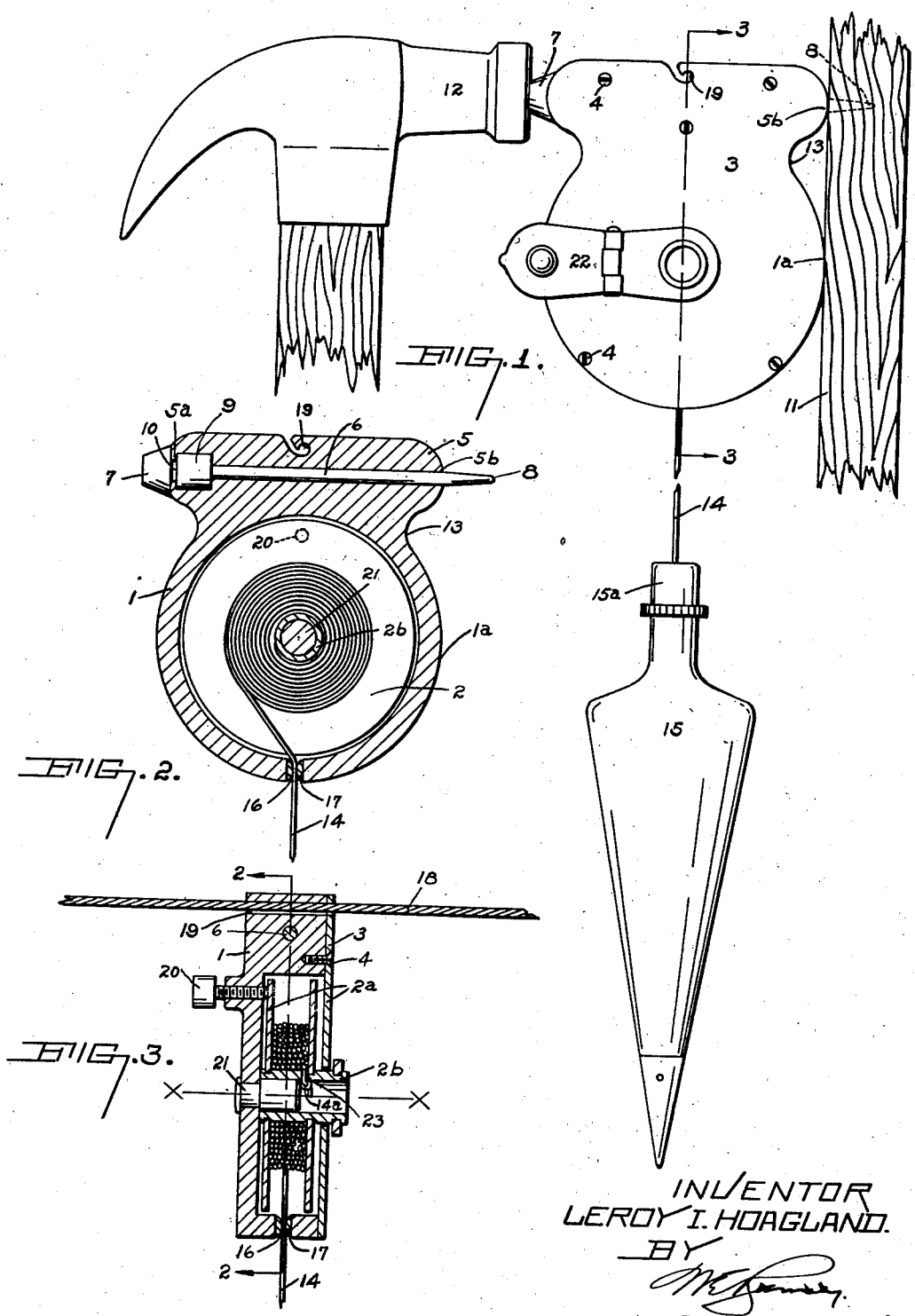
INVENTOR
LEROY I. HOAGLAND.
BY
ATTORNEY Patented Sept. 18, 1945

2,384,914

UNITED STATES PATENT OFFICE 2,384,914

PLUMB BOB LINE REEL

Le Roy I. Hoagland, Seaside, Oreg.

Application December 9, 1944, Serial No. 567,366

7 Claims. (Cl. 242—101)

The principal object of my invention is to provide a plumb bob line reel which can easily and quickly be secured in place to a vertical surface and can quickly and easily be adjusted to a fixed point. Said principal object is attained in a plumb bob line reel having a drum journalled in a casing which is relatively thin but has a massive cap formed integrally therewith. A nailing device is secured to the casing of said reel by passing it thru said massive cap and fixing it securely in the latter. Thus, said nailing device can be struck by a hammer to fasten said reel in position. The nailing device is in the massive cap so that the shock taken by the driving operation will be resisted by said cap and the casing is devised so that when said nailing device is secured against a plumb surface, it brings the axis of rotation of the reel and the guiding outlet thru the casing into vertical alinement without further adjustment. Said reel is provided with a screw type brake and thus the brake can be moved to a position where it permits the reel to run out the line only when substantial force is exercised. Thus, when the reel is set in place, the plumb bob can be pulled down to the point for which it is to be adjusted by pulling on the plumb bob rather than by setting and releasing the brake.

A further and more specific object of my invention is to provide a nailing or fastening connection of this character which, although secured to the casing, is a continuous thru member and thus the blows struck on the nailing device by a hammer, for example, are not transmitted thru the casing which might fracture the latter.

A further object of my invention is to provide a plumb bob line reel which is adapted either to be nailed to a vertical wall or to be suspended from a line. Both of said fastening devices are arranged so that the plumb line extends thru the center of mass of said reel and thus exerts no tipping action on the fastening device which would destroy the accuracy of the original setting.

Further and other structural details of my invention are hereinafter described with reference to the accompanying drawing, in which:

Fig. 1 is an elevation of a plumb bob line reel and plumb bob assembly embodying my invention, also illustrating the manner in which the plumb bob line reel can be secured to a vertical wall;

Fig. 2 is a transverse section thru the plumb bob reel taken on the line 2—2 in Fig. 3, said section being taken longitudinally thru the nailing connection; and Fig. 3 is a cross-sectional view of said reel taken on the line 3—3 in Fig. 1, taken thru the notched connection provided to permit said reel to be supported by a wire or other relatively taut line.

A plumb bob line reel embodying my invention comprises a cylindrical casing 1 having more or less thin walls which enclose journalled drum 2. Said casing is cup-shaped in section and the open face is closed by a removable cover 3. Said cover is secured in place by screws 4 so as to permit access to said drum. The upper portion of the casing is formed into a massive head or cap 5. If the casing and head are viewed in elevation, as in Fig. 1, said casing resembles a flattened figure 8.

Extending transversely thru the two upper lobes of said casing and lengthwise thru the head or cap 5 is a nailing device 6 having a head 7 at one end and a more or less sharpened point 8 at the other end. Intermediate said head and point is a cylindrical collar 9 adjacent the head but spaced slightly therefrom. Said collar is slightly smaller in diameter than the base of the head 7 and the head or cap is provided with a flanged portion 5a. Said casing and cap preferably are made of an aluminum alloy or some other light but malleable material. When the nailing device is passed through the bore formed in said head or cap it is, of course, driven point first thru said bore and when the head reaches the approximate position shown in Fig. 2, it engages said flanged portion and bends said portion inwardly, as is illustrated in Fig. 2, into the space 10 left between the collar and the said head. This clinches the nailing device tightly in place and yet provides some spring or resiliency or play between the nailing device and the cap of said casing. The nailing device is preferably made of some hard material such as steel, so that it constitutes a good driving member and it will stand a good deal of battering. The point also is adapted to stand numerous insertions into more or less tough material. Said nailing device is adapted to be forced into a wall such as 11, by being driven by a hammer 12, as is illustrated in Fig. 1. The blows of said hammer are transmitted somewhat to the casing but because of the slight yielding or play of the flange portion 5a and the massive section of said head or cap, said parts are capable of withstanding severe, rough usage without affecting the mounting of the drum in its casing.

As is illustrated in Fig. 1, the projecting portion 5b or lobe of said head or cap thru which the point 8 of the nailing device projects is in alinement with the projection 1a of the casing or lower right-hand lobe of said casing, as viewed in Fig. 1. Between said parts is an indentation 13 between said two lobes, and thus when the casing is fixed in position, it touches only on two points, which being alined, causes the casing to aline itself approximately with said wall 11. Thus, the plumb line 14, with its bob 15 suspended thereon, hangs pendant from the casing. I preferably provide an aperture 16 which has a diameter slightly larger than the plumb line and bush said aperture with a hardened bead 17. Said line has a smooth sliding fit in passing outwardly from the bottom of the casing as is viewed in Fig. 2. Said bead is normally rounded on its faces adjacent the bore thereof so as to eliminate rubbing or cutting of said line which would tend to fray the latter. The axis x—x of rotation of said drum is vertically alined with the bore of said bead and the whole plumb bob line reel is substantially symmetrical in shape and in lateral disposition of mass about said axis and thus said plumb bob line reel tends to remain alined with the plumb line when it is fixed in place. When it is desired to support said plumb bob line reel on a taut line or wire 18, I attach said casing thereto thru a transverse supporting notch 19. Because said assembly is only pendantly supported in this manner, it is essential that all of said points be in alinement and thus I arranged said transverse supporting notch, the axis x—x of the drum, and the bore of bead 17 in vertical alinement to secure accuracy and free running of the line and the reel therefor. This arrangement is particularly desirable in setting the plumb bob over a point when the reel is supported by a taut line or wire 18. I preferably perform this operation by setting the braking screw 20 against one flange 2a of drum 2 so that said drum will be held against free rotation but will be permitted to turn slightly if a substantial pull is exerted on the plumb line 14. Thus, the casing can be arranged with the notch 19 in engagement with said taut line or wire 18 and the brake can be set in this manner and the user of my invention can drop the plumb bob into approximate abutment and alinement with the datum point. Then he can take hold of the plumb bob or the line and pull on it until the point of the plumb bob comes into registration with the datum point.

Said drum 2 is provided with two flanges as is illustrated in Fig. 3 and is provided with a tubular shaft 2b. Said shaft is journalled upon a trunnion 21 riveted to the casing 1. A hinged handle 22 is secured to the tubular shaft 2b so as to rotate said shaft and therewith the drum to pay out or spool in the plumb line. One end of said line is passed thru an aperture 23 in the tubular shaft and the plumb line is knotted at 14a to prevent inadvertent detachment of said plumb line with the drum.

I preferably select that type of plumb bob which is detachable from the plumb line. To this end the plumb bob is provided with a rotatable collar 15a for engaging the knotted end of the plumb line (not shown). Thus, it is possible for the reel and the plumb bob to be separately carried and when said device is to be used, the bob is secured to the knotted end of the plumb line in the manner illustrated in Fig. 1. If it is desired to plumb a vertical wall as is shown in Fig. 1, the reel is secured to the wall at a designated point, by driving the nailing device into the wall as is illustrated in Fig. 1. The plumb bob is then lowered to approximate position and the braking screw is set to prevent the rotation of the reel and a closer adjustment is made by pulling on the plumb line to bring the point of the plumb bob into juxtaposition with the point with which it is to be alined, as has previously been pointed out. If the device is to be supported by a taut line, the same procedure is followed except that the reel is engaged to the line by passing said line thru the transverse supporting notch 19 in the manner illustrated in Fig. 3 and the same procedure is carried out.

The reel can spool in the line by rotating the handle 22 when it is extended as it is shown in Fig. 1. The handle, the tubular shaft, and the flanges of the drum are secured to each other so as to rotate as an integral structure within the casing and about the trunnion 21. The plumb bob line reel can be carried in the workman's pocket with the plumb bob attached as is shown in Fig. 1, or with the plumb bob detached, as has previously been described.

I claim:

1. A plumb bob line reel comprising a relatively cylindrical casing, a drum rotatably mounted in said casing, and means for fastening said reel to a mounting, comprising a nailing device fixed in said casing extending transversely and continuously thru said casing, having a protruding head at one end and a sharpened point at the other.

2. A plumb bob line reel comprising a relatively thin cylindrical casing having an integral massive cap formed thereon, a drum rotatably mounted in said casing, and means for fastening said reel to a mounting, comprising a nailing device fixed in said casing extending transversely and continuously thru said casing cap, having a protruding head at one end and a sharpened point at the other, said cap immediately underneath said device head being counterbored, a collar on said nailing device spaced slightly from said head and being slightly smaller in diameter than the latter, whereby when said nailing device is driven in place a portion of the cap adjacent said counterbore may be swaged over and about said collar.

3. A plumb bob line reel comprising a relatively thin cylindrical casing having an integral massive cap formed thereon, a drum rotatably mounted in said casing, and means for fastening said reel to a mounting, comprising a nailing device fixed in said casing, extending transversely and continuously thru said casing cap having a protruding head at one end and a sharpened point at the other, the exterior surface of said cap adjacent said pointed end of the nailing device being alined with an adjacent exterior portion of said casing to assure alinement of said reel when said reel is secured to a vertical support.

4. A plumb bob line reel comprising a relatively cylindrical casing, a drum rotatably mounted in said casing, and means for fastening said reel to a mounting, comprising a nailing device fixed in said casing extending transversely and continuously thru said casing, having a protruding head at one end and a sharpened point at the other, a transverse supporting notch formed in said cap, and a closefitting guideway for the line spooled from said reel, said notch and guideway being arranged in vertical alinement on the vertical centerline of mass of said reel and with the axis of rotation of said drum.

5. A plumb bob line reel comprising a relatively thin cylindrical casing having an integral massive cap formed thereon, a drum rotatably mounted in said casing, and means for fastening said reel to a mounting, comprising a nailing device fixed in said casing extending transversely and continuously thru said casing cap, having a protruding head at one end and a sharpened point at the other.

6. A plumb bob line reel comprising a relatively cylindrical casing, a flanged drum rotatably mounted in said casing, a threaded screw brake frictionally engaging one flange of said drum, and means for fastening said reel to a mounting, comprising a nailing device fixed in said casing extending transversely and continuously thru said casing, having a protruding head at one end and a sharpened point at the other.

7. A plumb bob line reel comprising a relatively thin cylindrical casing having an integral massive cap formed thereon, a flanged drum rotatably mounted in said casing, a threaded screw brake frictionally engaging one flange of said drum, and means for fastening said reel to a mounting, comprising a nailing device fixed in said casing extending transversely and continuously thru said casing cap, having a protruding head at one end and a sharpened point at the other, the exterior surface of said cap adjacent said pointed end of the nailing device being alined with an adjacent exterior portion of said casing to assure alinement of said reel when said reel is secured to a vertical support, a transverse supporting notch formed in said cap, and a close-fitting guideway for the line spooled from said reel, said notch and guideway being arranged in vertical alinement on the vertical centerline of mass of said reel and with the axis of rotation of said drum.

LE ROY I. HOAGLAND.